(12) United States Patent
Wu et al.

(10) Patent No.: US 8,898,208 B2
(45) Date of Patent: Nov. 25, 2014

(54) METHOD AND SYSTEM FOR PROCESSING IMAGES

(75) Inventors: Yongjian Wu, Shenzhen (CN); Yang Yang, Shenzhen (CN); Liqian Dong, Shenzhen (CN); Dong Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/129,569

(22) PCT Filed: May 30, 2012

(86) PCT No.: PCT/CN2012/076270
§ 371 (c)(1),
(2), (4) Date: Dec. 27, 2013

(87) PCT Pub. No.: WO2013/004114
PCT Pub. Date: Jan. 10, 2013

(65) Prior Publication Data
US 2014/0143229 A1   May 22, 2014

(30) Foreign Application Priority Data
Jul. 1, 2011   (CN) .......................... 2011 1 0184156

(51) Int. Cl.
*G06F 17/30* (2006.01)

(52) U.S. Cl.
CPC ...... *G06F 17/30112* (2013.01); *G06F 17/3028* (2013.01); *G06F 17/30* (2013.01); *G06F 17/30442* (2013.01)
USPC ........................................................ 707/828

(58) Field of Classification Search
CPC ............ G06F 17/30058; G06F 17/301; G06F 17/30115; G06F 17/30126; G06F 17/3028
See application file for complete search history.

(56) References Cited

U.S. PATENT DOCUMENTS 5,761,655 A  *  6/1998  Hoffman .............................. 1/1
8,683,352 B2 * 3/2014  Scherpa et al. ............... 715/753
(Continued)

FOREIGN PATENT DOCUMENTS

| | | |
|---|---|---|
| CN | 1707479 A | 12/2005 |
| CN | 101305607 A | 11/2008 |
| JP | H11-338604 A | 12/1999 |
| JP | 2003108976 A | 4/2003 |

OTHER PUBLICATIONS

"PhotoTOC—Automatic Clustering for Browsing Personal Photographs," by Platt et al. IN: ICICS-PCM 2003. Available at: IEEE.*

(Continued)

*Primary Examiner* — Daniel Kinsaul
(74) *Attorney, Agent, or Firm* — Harness, Dickey & Pierce, P.L.C.

(57) ABSTRACT

The present disclosure describes a method and a system for processing images. The method includes: determining a target folder selected by a user; searching for image information of the target folder, searching for information of all subfolders of the target folder, traversing all subfolders corresponding to the information of all subfolders and obtaining image information of all subfolders; and obtaining images according to the image information of the target folder and the image information of all subfolders, processing the obtained images and displaying the processed images in a flat-folder-view manner.

11 Claims, 7 Drawing Sheets

(56) References Cited

U.S. PATENT DOCUMENTS

| | | | |
|---|---|---|---|
| 2005/0246331 A1* | 11/2005 | De Vorchik et al. | 707/3 |
| 2005/0278331 A1 | 12/2005 | Hatori | |
| 2005/0289133 A1* | 12/2005 | Arrouye et al. | 707/4 |
| 2009/0119596 A1 | 5/2009 | Iwahara et al. | |
| 2012/0059857 A1* | 3/2012 | Jackson, Jr. | 707/797 |

OTHER PUBLICATIONS

International Search Report for PCT/CN2012/076270, mailed Aug. 2, 2012.

Written Opinion of the International Searching Authority (in English and Chinese) for PCT/CN2012/076270, mailed Aug. 2, 2012; ISA/CN.

* cited by examiner

METHOD AND SYSTEM FOR PROCESSING IMAGES

CROSS REFERENCE TO RELATED APPLICATIONS

This application is a 371 National Phase application based on PCT/CN2012/076270, filed May 30, 2012, which claims the benefit of and priority to Chinese Patent Application No. 201110184156.6, entitled "method and system for processing images", filed on Jul. 1, 2011, the disclosures of which are incorporated herein in their entirety by reference.

FIELD

The present disclosure relates to computer techniques, and more particularly, to a method and a system for processing images.

BACKGROUND

Traditional image managing software merely enables a user to view images in a single folder. If the user wants to view images in all subfolders of the folder, he has to open each subfolder one by one to view all of the images. The operation is complex.

SUMMARY

In contrast to this, an example of the present disclosure provides a method for processing images, so as to display images in any folder and its subfolders in a flat-folder-view manner conveniently. The flat-folder-view means that images in all subfolders of a target folder (and also images in the target folder) are displayed without opening the subfolders layer by layer, i.e., the target folder can be penetrated to display images in the target folder and all subfolders.

According to an example of the present disclosure, a method for processing images includes:

determining a target folder selected by a user;

searching for image information of the target folder, searching for information of all subfolders of the target folder, traversing all subfolders corresponding to the information of all subfolders and obtaining image information of all subfolders; and obtaining images according to the image information of the target folder and the image information of all subfolders, processing the obtained images and displaying the processed images in a flat-folder-view manner.

It is also required to provide a system which displays images in any folder and its subfolder in the flat-folder-view manner conveniently.

According to an example of the present disclosure, the system for processing images includes:

a searching module, adapted to obtain a target folder selected by the user, search for image information of the target folder and information of all subfolders of the target folder, obtain image information of all subfolders, and obtain images according to the image information of the target folder and the image information of all subfolders;

a traversing module, adapted to traverse all subfolders corresponding to the information of the subfolders;

a processing module, adapted to process the images in the target folder selected by the user and the images in the subfolders; and a displaying module, adapted to display the processed images in the target folder and the processed images in the subfolders in a flat-folder-view manner.

In the above method and system for processing images, after a folder selected by the user is obtained, image information of the folder is found. At the same time, information of all subfolders of the folder and image information corresponding to each subfolder are obtained. Images are obtained according to the image information of the folder and the image information of all subfolders. The images are processed. The images in the subfolders and the images in the folder are displayed in the flat-folder-view manner. Thus, it is realized to display images of any folder and its subfolders in the flat-folder-view manner conveniently.

DETAILED DESCRIPTION

Figure 1:
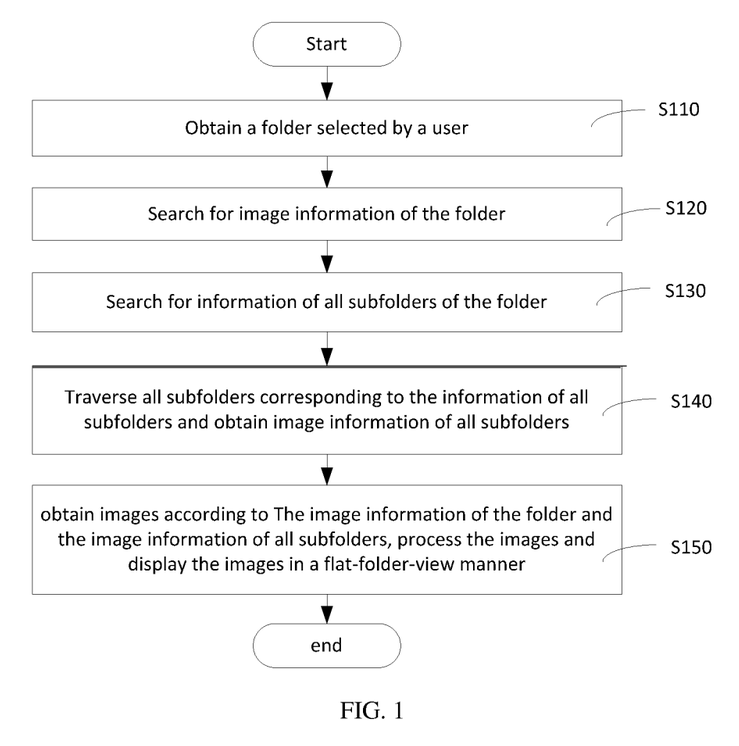
FIG. 1 is a flowchart illustrating a method for processing images according to an example of the present disclosure.

As shown in FIG. 1, in an example, a method for processing images includes the following.

At block S110, a folder selected by a user is obtained.

The folder selected by the user via an input device such as a mouse or a keyboard is determined.

Before block S110, the method may further include the following. Create a database, store information of folders, information of subfolders, image information, a relationship between folders and subfolders, and association information between folders and images obtained by scanning in the database. After a file system is scanned, the information of folders, the information of subfolders, the image information and the association information between folders and images are obtained and stored in the database for facilitating subsequent searching. Both the information of the folders and the information of the subfolders may include a folder name, number of images in the folder, a subfolder relationship corresponding to the folder, etc. The image information may include an image name, an image size, etc. The association information between folders and images refers to a corresponding relationship between the folders and the images.

In addition, in a New Technology Fie System (NTFS) file system of Windows, all stored data are in a Master File Table (MFT) which is formed by file record arrays. A corresponding index may be created for a relationship between a folder and its subfolders based on the MFT, so as to facilitate searching. All files in the file system may be scanned rapidly through the MFT. The file scanning process through the MFT includes the following.

(1) Locate an MFT data area.

A data area of the MFT is firstly determined. The data area records directory information of folders. The directory information includes a folder name, folder addressing and number of images in the folder, etc.

(2) Traverse the MFT and obtain the directory information of the folder and a root index corresponding to the directory information from the MFT.

Data in the MFT is traversed one by one to obtain the root index corresponding to the directory information of the folder.

(3) Re-create a folder path according to the directory information of the folder and the corresponding root index and obtain the folder information.

The directory information includes the folder name and the folder addressing. According to the folder name, folder addressing and the number of images in the folder in the directory information and the folder path determined according to the root index, a relationship between the folder and subfolders is obtained.

At block S120, search for image information of the folder.

A database or a cache is searched for the image information of the folder.

At block S130, search for information of all subfolders of the folder.

The database or the cache is searched for the information of all subfolders.

At block S140, all subfolders corresponding to the information of all subfolders are traversed to obtain image information of all subfolders.

The image information of all subfolders is found through traversing all subfolders of the folder.

The sequence of block S120 and block S130 may be changed. In other words, it is possible to find the information of all subfolders of the folder first, i.e., find the information of all subfolders in the target folder, and then find the image information of the target folder and the image information of all subfolders of the target folder.

At block S150, images are obtained according to the image information of the folder and the image information of the subfolders. The images are processed and displayed in a flat-folder-view manner.

The images are obtained according to the image information. The images are processed, and the images in the folder and the images in the subfolders are displayed in the flat-folder-view manner. Thus, it is realized to display the images in the folder and all subfolders in one folder at the same time.

In addition, in block S130 and block S140, in order to obtain the image information of the folder and the image information of the subfolders, it is possible to search a cache to obtain the corresponding image information. If there is corresponding image information in the cache, the image information corresponding to the subfolders is directly retrieved from the cache. Thus, it is not required to search a database for the image information and time is saved.

In this example, the cache used for storing the image information is an image information cache which may include a background thread cache unit and a foreground thread cache unit. The background thread cache unit is used for caching newest image information to be displayed. The foreground thread cache unit is used for caching image information being displayed. After the background thread cache unit updates its image information to the foreground thread cache unit, the background thread cache unit is cleared. The double cache avoids data inconsistency between a foreground thread and a background thread due to the same data is used by the foreground thread and the background thread, and also avoids performance influence due to many lock operations which are used for ensure data consistency.

In one example, after the process of searching for the information of all subfolders of the folder, the method further includes: create a task list according to the information of the subfolders, wherein the subfolders corresponding to the information of the subfolders are task nodes of the task list. The task nodes of the task list are added to a folder task queue. Tasks in the task list are to find the image information of the subfolders according to the information of the subfolders.

In this example, the task list is in an inverted tree structure. A data structure of a node of the created task list includes: a finish attribute identifier of the task node, a tree height of a set where the task node is located, and a pointer pointing to a next node, etc.

In addition, the number of task nodes added to the folder task queue may be defined, e.g., the number may be defined as 5. Through defining the number of task nodes in the folder task queue, it may be avoided that the folder task queue becomes too long to affect a traversing efficiency.

When the task node is added to the folder task queue, the process of traversing all subfolders corresponding to the information of the subfolders to obtain the image information of the subfolders includes: traverse the task nodes in the folder task queue, and find the image information of the subfolders corresponding to the task nodes. The image information of the corresponding folder is found folder by folder through traversing the folder task queue.

After the task list is created, if one task node is finished, the task of obtaining image information transfers from the finished task node to an unfinished task node. The finished task node may be removed from the task list.

Figure 2:
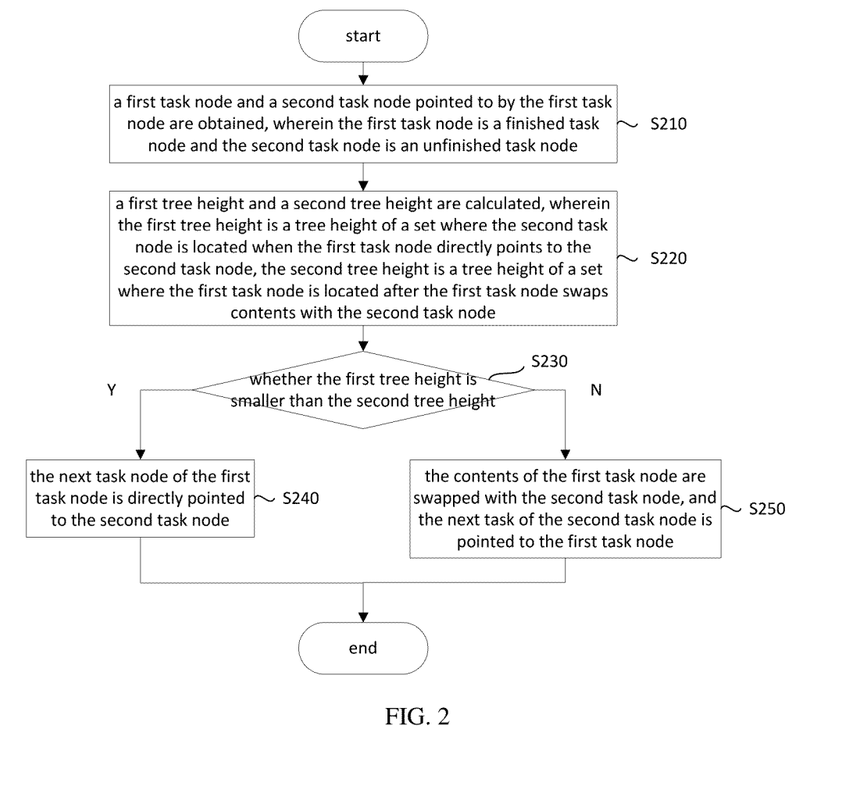
FIG. 2 is a flowchart illustrating a process of transferring an image obtaining task from a finished task node to an unfinished task node according to an example of the present disclosure.

As shown in FIG. 2, the process of transferring the task of obtaining image information from a finished task node to an unfinished task node includes the following.

At block S210, a first task node and a second task node pointed to by the first task node are obtained, wherein the first task node is a finished task node and the second task node is an unfinished task node.

Figure 3:
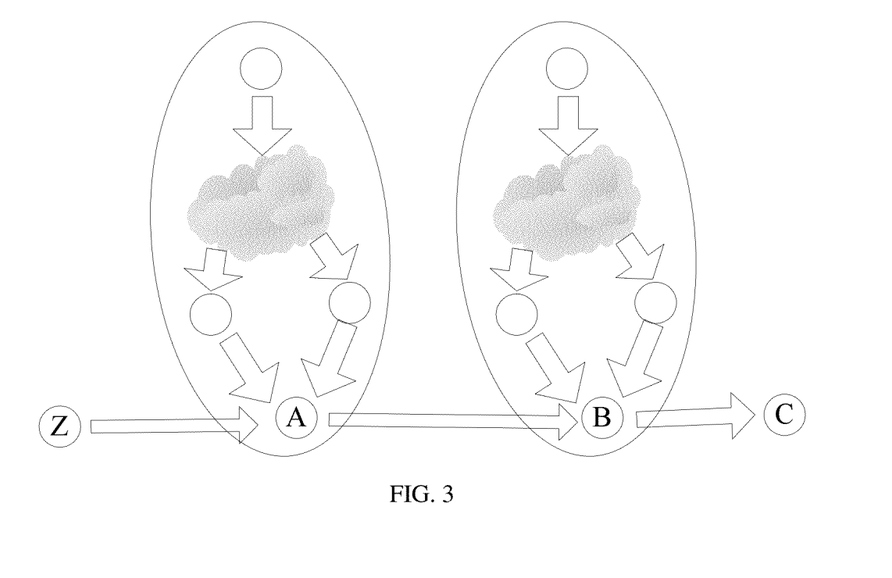
FIG. 3 is a schematic diagram illustrating task nodes and a node set according to an example of the present disclosure.

Around a task node, there are other task nodes. The other task nodes hanging on one task node denote a set of finished task nodes nearest to this task node. As shown in FIG. 3, the first task node A is a finished task node and will be removed. The second task node B is an unfinished task node next to the first task node A.

In one example, the above image processing method further includes: configure a finish attribute identifier for each task node. The finish attribute identifier may indicate a finished status by "true" (or 1) and indicate an unfinished status by "false" (or 0).

Block S210 specifically includes the following. Query a task node pointed to by the first task node and check the finish attribute identifier of the task node. If the finish attribute identifier indicates an unfinished status, the task node is taken as the second task node pointed to by the first task node. If the finish attribute identifier indicates a finished status, another task node pointed to by the first task node is traversed.

At block S220, a first tree height and a second tree height are calculated, wherein the first tree height is a tree height of a set where the second task node is located when the first task node directly points to the second task node, the second tree height is a tree height of a set where the first task node is located after the first task node swaps contents with the second task node.

Suppose that the tree height of the set where the first task node is located is height A and the tree height of the set where the second task node is located is height B.

Figure 4:
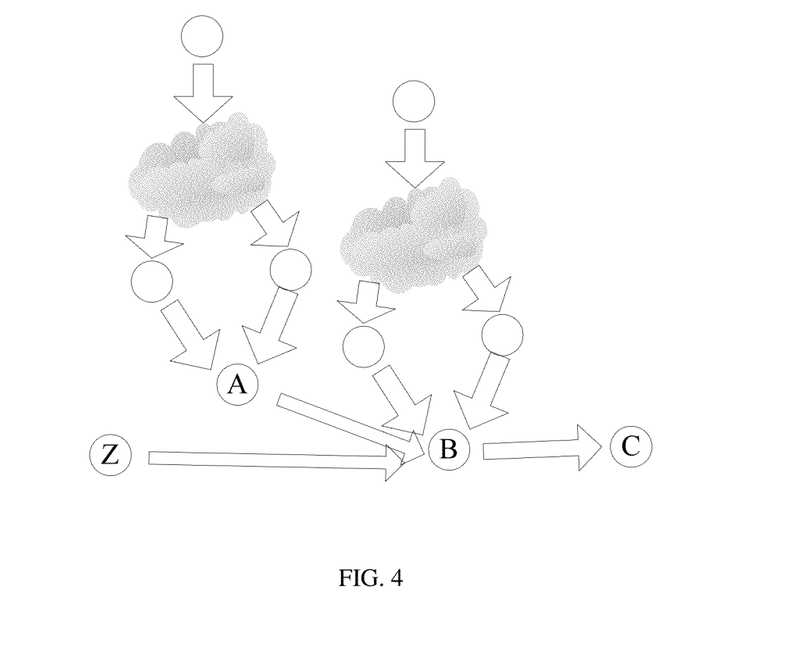
FIG. 4 is a schematic diagram illustrating an example of the present disclosure in which a first task node A does not swap contents with a second task node B.

As shown in FIG. 4, in which the next task of the first task node A is directly pointed to the second task node B, the first task node A is identified as a finished task node, and the set of task nodes which originally hang on the first task node A are hung on the second task node B through the first task node A. Therefore, the tree height of the set where the second task node B is located is a maximum value between height A+1 and height B, max(height A+1, height B), i.e., the first tree height.

Figure 5:
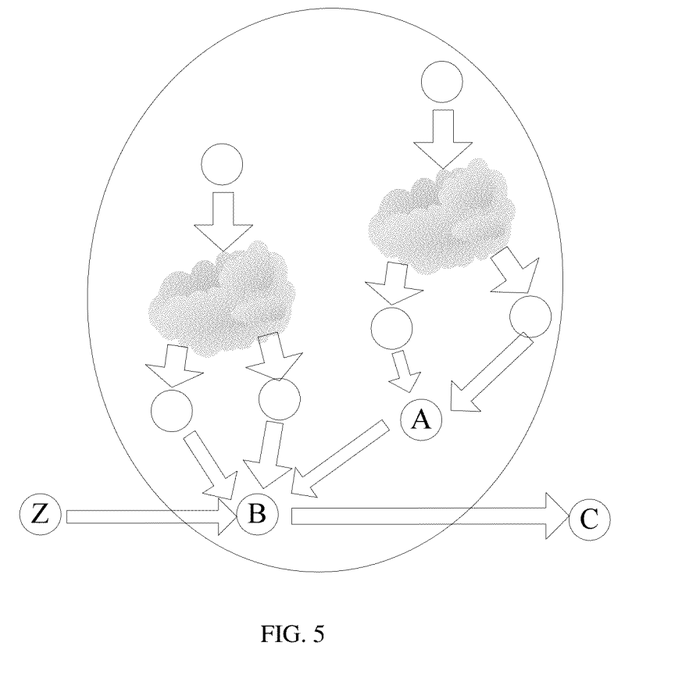
FIG. 5 is a schematic diagram illustrating an example of the present disclosure in which the first task node A swaps contents with the second task node B.

As shown in FIG. 5, in which the contents of the first task node A are swapped with the second task node B (i.e., the original first task node A is a new second task node B, and the original second task node B is a new first task node A), the first task node A is identified as finished, and the next task of the first task node A is pointed to the second task node B. The set of nodes which originally hang on the second task node B are hung on the new second task node B through the first task node A. Therefore, the tree height of the set where the second task node B is located is a maximum value between height B+1 and height A, max (height B+1, height A), i.e., the second tree height.

At block S230, it is determined whether the first tree height is smaller than the second tree height. If yes, block S240 is performed; otherwise, block S250 is performed.

Values of max (height A+1, height B) and max (height B+1, height A) are compared to obtain a smaller one of them. If the value of max (height A+1, height B) is smaller than that of max (height B+1, height A), the next task of the first task node A is directly pointed to the second task node B. If the value of max (height A+1, height B) is not smaller than that of max (height B+1, height A), contents of the first task node A are swapped with the second task node B and then the next task of the new first task node A is pointed to the new second task node B, i.e., the next task of the original second task node B is pointed to the original first task node A.

At block S240, the next task node of the first task node is directly pointed to the second task node.

At block S250, the contents of the first task node are swapped with the second task node, and the next task of the second task node is pointed to the first task node.

The above task list adopts an inverted tree structure. A manner of going to an unfinished task node from a finished task node is obtained through calculating the tree height. Therefore, it can be seen that the tree height of the inverted tree structure of the task list increases very slowly. However, the time for transferring from a finished task node to an unfinished task node is reduced. For a large number of tasks, the efficiency is improved and it is possible to obtain image information conveniently and rapidly, so as to view the images rapidly.

Figure 6:
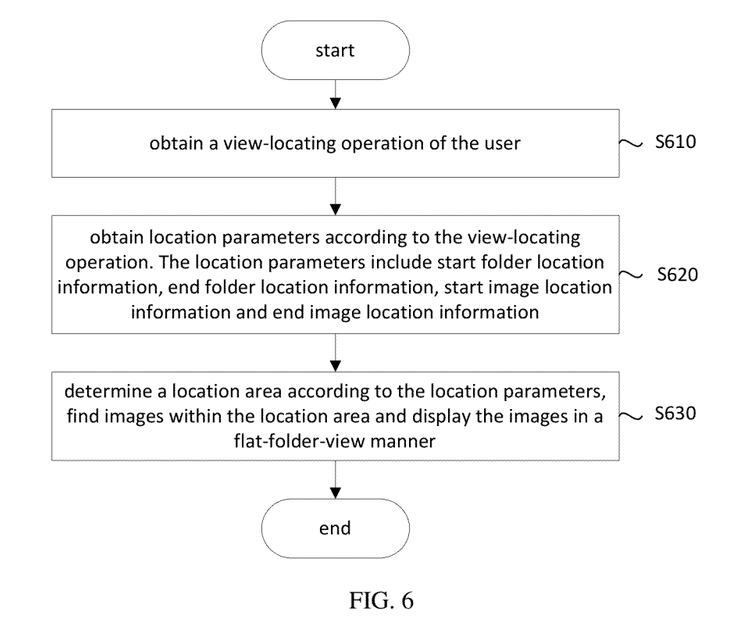
FIG. 6 is a flowchart illustrating a process of obtaining a view-locating operation for viewing images of a user according to an example of the present disclosure.

When there are a large number of images, thumbnails of the images cannot be displayed completely in a displaying interface. At this time, the thumbnails may be displayed using a scrollbar or in pages. As shown in FIG. 6, after a movement of the scrollbar or other operation of the user is obtained, the detailed image processing method includes the following.

At block S610, a view-locating operation of the user is obtained.

The view-locating operation may be an operation such as moving the scrollbar or clicking a page button if the thumbnails are displayed in pages.

At block S620, location parameters are obtained according to the view-locating operation. The location parameters include start folder location information, end folder location information, start image location information and end image location information.

After the user moves the scrollbar, locations of the thumbnails displayed on the displaying interface are changed. Some thumbnails displayed on the displaying interface are hidden and some thumbnails not displayed on the displaying interface are displayed. The corresponding start image location information, end image location information, start folder location information and end folder location information are also changed.

At block S630, a location area is determined according to the location parameters and images within the location area are found and are displayed in a flat-folder-view manner.

Block S630 specifically includes: determine whether there is image information within the location area in the cache. If there is image information within the location area in the cache, the image information is obtained from the cache. Images are found according to the image information. The images found out are processed to generate corresponding thumbnails to be displayed. If there is not image information within the location area in the cache, the corresponding image information is found out from the database according to the location area. Images are found according to the obtained image information. The images found out are processed to generate corresponding thumbnails to be displayed. The image information is stored in the cache. Thus, it is not required to find the image information from the database when the user views the images next time. The efficiency is improved. The cache is an image information cache. The thumbnails of the images within the location area are displayed to the user, so as to facilitate the viewing of the user. The images are displayed in form of thumbnails, which saves displaying spaces.

In addition, it is possible to search a cache for the corresponding thumbnails according to the image information within the location area. If there are the corresponding thumbnails, the thumbnails are retrieved from the cache and displayed. If there are not the corresponding thumbnails, the images are found from the database according to the image information. The images found out are processed to generate thumbnails to be displayed. The thumbnails are stored in the cache which is a thumbnail cache. Efficiency is improved through retrieving the thumbnails from the cache and network resources are saved.

Figure 7:
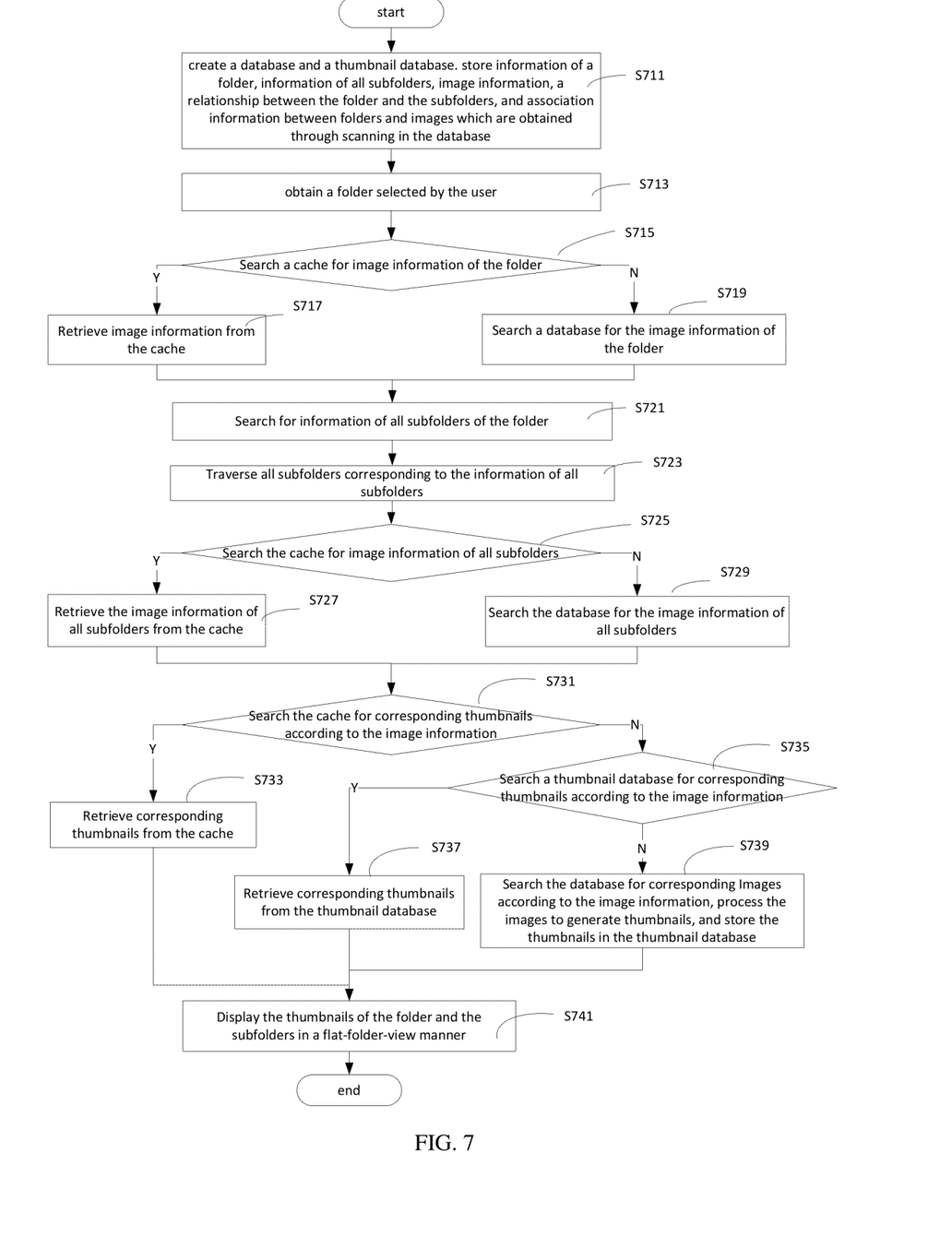
FIG. 7 is a flowchart illustrating a method for processing images according to an example of the present disclosure.

In an example, as shown in FIG. 7, a method for processing images includes the following operations.

At block S711, a database and a thumbnail database are created. Information of a folder, information of all subfolders, image information, a relationship between the folder and the subfolders, and association information between folders and images which are obtained through scanning are stored in the database. Thumbnails of the images are stored in the thumbnail database. Contents in the database are the same as those described above and will not be repeated herein.

At block S713, a folder selected by the user is obtained.

In this block, it is determined which folder is the target folder selected by the user.

At block S715, the cache is searched for the image information of the folder. If there is the image information in the cache, block S717 is performed; otherwise, block S719 is performed. Once the user views the images, the image information and the images which have been viewed by the user are stored in the cache. If the cache has the image information of the folder that the user searches for this time, the image information may be directly retrieved from the cache.

At block S717, the image information is retrieved from the cache. The cache may also adopt a double cache scheme, i.e., a foreground thread cache unit and a background thread cache unit. The foreground thread cache unit provides image information being displayed, and the background thread cache unit provides newest image information needs to be displayed. As such, data inconsistency due to the same data is used by the foreground thread and the background thread is avoided and impact on performance due to a large amount of lock operations which are performed to ensure data consistency can be avoided.

At block S719, the database is searched for the image information of the folder.

At block S721, search for information of all subfolders of the folder.

At block S723, all subfolders corresponding to the information of all subfolders are traversed. The traversing process is the same as that described above and will not be repeated herein.

At block S725, the cache is searched for the image information of all subfolders. If there is the image information of all subfolders, block S727 is performed; otherwise, block S729 is performed.

At block S727, the image information of the subfolders is retrieved from the cache.

At block S729, the database is searched for the image information of all subfolders.

The sequence of the process of finding the image information of the target folder and the process of finding the information of all subfolders of the target folder is not restricted in examples of the present disclosure. The sequence of the process of finding the image information of the target folder and the process of finding the image information of the subfolders is also not restricted. For example, block S719 may also be executed between block S721 and block S723.

At block S731, the cache is searched for corresponding thumbnails according to the image information. If there is corresponding thumbnails, block S733 is performed; otherwise, block S735 is performed.

At block S733, the corresponding thumbnails are retrieved from the cache.

At block S735, the thumbnail database is searched for corresponding thumbnails according to the image information. If there is corresponding thumbnails, block S737 is performed; otherwise, block S739 is performed.

At block S737, the corresponding thumbnails are retrieved from the thumbnail database. Through retrieving the thumbnails from the thumbnail database, it is not required to decode the images to generate thumbnails each time the images are viewed, which decreases the efficiency.

At block S739, the database is searched for the corresponding images according to the image information. The images are processed to obtain the corresponding thumbnails of the images. The obtained thumbnails are stored in the thumbnail database.

At block S741, the thumbnails in the folder and all subfolders are displayed in a flat-folder-view manner.

Figure 8:
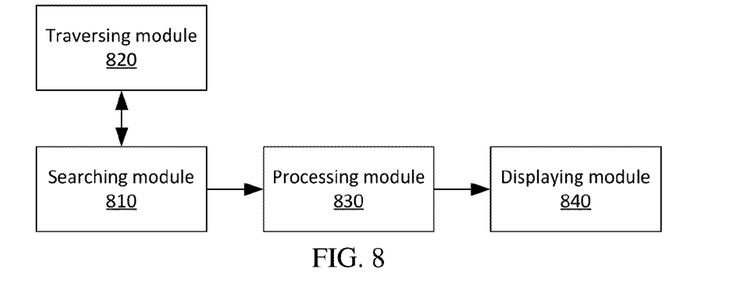
FIG. 8 is a schematic diagram illustrating a structure of a system for processing images according to an example of the present disclosure.

In one example, as shown in FIG. 8, a system for processing an image includes: a searching module 810, a traversing module 820, a processing module 830 and a displaying module 840.

The searching module 810 is adapted to obtain a folder selected by the user, search for image information of the folder and information of all subfolders of the folder. The information of the folder and the information of the subfolders include the same type of contents, e.g., a folder name, number of images stored in the folder, subfolder relationship corresponding to the folder, etc. The image information may include an image name, an image size, etc.

The traversing module 820 is adapted to traverse all subfolders corresponding to the information of the subfolders. The traversing module 820 traverses all subfolders in the folder, such that the searching module 810 searches for the image information in all subfolders.

The searching module 810 is further adapted to obtain the image information of all subfolders. The searching module 810 obtains images according to the image information of the folder and the image information of the subfolders.

The processing module 830 is adapted to process the images in the folder and the images in the subfolders.

The displaying module 840 is further adapted to display the processed images in the folder and the subfolders in a flat-folder-view manner. The displaying module 840 displays the images in the folder and the subfolders together, which realizes displaying of the images of one folder and its subfolders in one folder at the same time.

Figure 9:
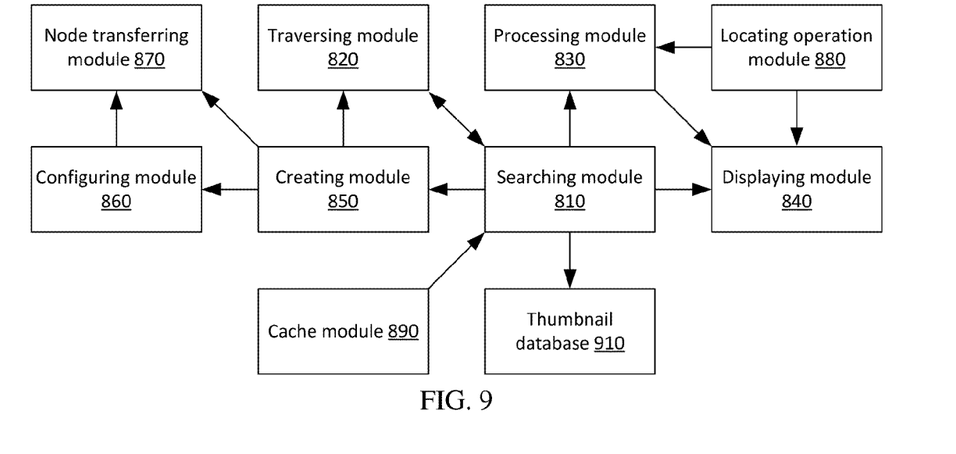
FIG. 9 is a schematic diagram illustrating another structure of a system for processing images according to an example of the present disclosure.

In one example, as shown in FIG. 9, besides the searching module 810, the traversing module 820, the processing module 830 and the displaying module 840, the above system for processing images may further include a creating module 850, a configuring module 860, a node transferring module 870, a locating operation module 880, a cache module 890 and a thumbnail database 910.

The creating module 850 is adapted to create a database, and store information of the folder, information of all subfolders, image information, relationship between the folder and the subfolders, association information between folders and images which are obtained by scanning in the database. The association information between folders and images is a corresponding relationship between the folders and the images. The creating module 850 is further adapted to create a task list according to the information of all subfolders. The task list is in an inverted tree structure. Subfolders corresponding to the information of all subfolders are task nodes of the task list. The task nodes of the task list are added to a folder task queue. The task in the task list is to find the image information of the subfolders according to the information of the subfolders.

The data structure of the task list is as defined in the above method example. The creating module 850 may further define the number of task nodes added to the folder task queue, e.g., define the number to be 5. Through defining the number of task nodes added into the folder task queue, it is avoided that the folder task queue is too long to affect a traversing efficiency.

The traversing module 820 is further adapted to traverse the folder task queue. The searching module 810 finds the image information of the subfolder corresponding to the task node. The searching module 810 may find the image information in the database.

The configuring module 860 is adapted to configure a finish attribute identifier for each task node. The finish attribute identifier may indicate a finished status using "true" (or 1) and indicate an unfinished status using "false" (or 0).

The node transferring module 870 is adapted to transfer an image information obtaining task from a finished task node to an unfinished task node pointed to by the finished task node.

Figure 10:
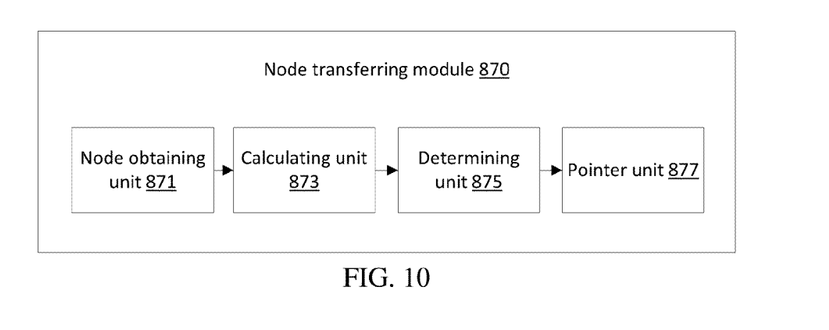
FIG. 10 is a schematic diagram illustrating an inner structure of a node transferring module in FIG. 9 according to an example of the present disclosure.

In one example, as shown in FIG. 10, the node transferring module 870 includes a node obtaining unit 871, a calculating unit 873, a determining unit 875 and a pointer unit 877.

The node obtaining unit 871 is adapted to obtain a first task node and a second task node pointed to by the first task node, wherein the first task node is a finished task node and the second task node is an unfinished task node. Around a task node, there are other task nodes. The other task nodes hanging on one task node denote a set of finished task nodes nearest to this task node. As shown in FIG. 3, the first task node A is a finished task node and will be removed. The second task node B is an unfinished task node next to the first task node A.

The node obtaining unit 871 is further adapted to query a task node pointed to by the first task node and check the finish attribute identifier of the task node. If the identifier indicates an unfinished status, the task node is taken as the second task node pointed to by the first task node. If the identifier indicates a finished status, another task node pointed to by the first task node is traversed.

The calculating unit 873 is adapted to calculate a first tree height and a second tree height, wherein the first tree height is a tree height of a set where the second task node is located when the first task node directly points to the second task node, the second tree height is a tree height of a set where the first task node is located after the first task node swaps contents with the second task node.

Suppose that the tree height of the set where the first task node is located is height A and the tree height of the set where the second task node is located is height B.

As shown in FIG. 4, in which the next task of the first task node A is directly pointed to the second task node B, the first task node A is identified as a finished task node, and set of task nodes which originally hang on the first task node A are hung on the second task node B through the first task node A. Therefore, the tree height of the set where the second task node B is located is a maximum value between height A+1 and height B, max(height A+1, height B), i.e., the first tree height.

As shown in FIG. 5, in which the contents of the first task node A are swapped with the second task node B (i.e., the original first task node A is a new second task node B, and the original second task node B is a new first task node A), the first task node A is identified as finished, and the next task of the first task node A is pointed to the second task node B. The set of nodes which originally hang on the second task node B are hung on the new second task node B through the first task node A. Therefore, the tree height of the set where the second task node B is located is a maximum value between height B+1 and height A, max (height B+1, height A), i.e., the second tree height.

The determining unit 875 is adapted to determine whether the first tree height is smaller than the second tree height.

The pointer unit 877 is adapted to directly point the next task of the first task node to the second task node if the first tree height is smaller than the second tree height, and to swap contents of the first task node with the second task node and point the next task of the new first task node to the new second task node if the first tree height is not smaller than the second tree height.

Values of max (height A+1, height B) and max (height B+1, height A) are compared to obtain a smaller one of them. If the value of max (height A+1, height B) is smaller than that of max (height B+1, height A), the pointer unit 877 directly points the next task of the first task node A to the second task node B. If the value of max (height A+1, height B) is not smaller than that of max (height B+1, height A), the pointer unit 877 swaps contents of the first task node A with the second task node B and then points the next task of the new first task node A to the new second task node B, i.e., point the next task of the original second task node B to the original first task node A.

In addition, a removing module may be further included. The removing module is adapted to remove a finished task node in the task list.

The locating operation module 880 is adapted to obtain a view-locating operation of the user and obtain location parameters according to the view-locating operation. The location parameters include start folder location information, end folder location information, start image location information and end image location information. The locating operation module 880 is further adapted to determine a location area according to the location parameters. The view-locating operation may be an operation such as moving the scrollbar or clicking a page button if the thumbnails are displayed in pages. The searching module 810 is further adapted to search for images within the location area. The displaying module 840 is further adapted to display the images within the location area in a flat-folder-view manner. In addition, the processing module 830 may process the images found out within the location area into thumbnails and the displaying module 840 displays the thumbnails in the flat-folder-view manner.

The cache module 890 is adapted to cache the image information. The searching module 810 is further adapted to obtain the image information from the cache module 890 if the cache module 890 has the image information within the location area, and adapted to obtain the images according to the image information. The processing module 820 is further adapted to process the images found out to generate thumbnails. The displaying module 890 is further adapted to display the thumbnails in the flat-folder-view manner. The searching module 810 is further adapted to search the database for the image information according to the location area if the cache module 890 does not have the image information within the location area. The cache module 890 is further adapted to cache the image information.

In addition, the cache module 890 includes an image information cache module which is used for cache the image information. The image information cache module may include a foreground thread cache unit and a background thread cache unit. The foreground thread cache unit provides image information being displayed, and the background thread cache unit provides newest image information needs to be displayed. After the background thread cache unit updates its image information to the foreground thread cache unit, the background thread cache unit is cleared. As such, data inconsistency due to the same data is used by the foreground thread and the background thread is avoided and impact on performance due to a large amount of lock operations which are performed to ensure data consistency can be avoided.

The cache module 890 may further store the thumbnails. The searching module 810 is further adapted to retrieve corresponding thumbnails from the cache module 890 if the corresponding thumbnails are found in the cache module 890 according to the image information. Through retrieving the thumbnails from the cache, the efficiency is improved and the network resources are saved.

The cache module 890 may further include a thumbnail cache module used for cache the thumbnails.

The thumbnail database 910 is adapted to store the thumbnails. The searching module 810 is further adapted to retrieve corresponding thumbnails from the thumbnail database 910 if the corresponding thumbnails are found in the thumbnail database 910 according to the image information, and adapted to search the database for corresponding images according to the image information if the corresponding thumbnails are not found in the thumbnail database 910. The processing module 820 is further adapted to process the images to generate thumbnails and store the thumbnails in the thumbnail database 910.

According to the above image processing method and system, after a folder selected by the user is obtained, the image information of the folder is found. Information of all subfolders of the folder and image information corresponding to all subfolders are also found. Images are obtained according to the image information of the folder and the image information of all subfolders. The images are processed. The images in the folder and the images in all subfolders are displayed in the flat-folder-view manner. Thus, the flat-folder-view of images in any folder and its subfolders is realized and the operation is convenient.

In addition, an unfinished task node may be found rapidly through the task list. The searching efficiency is increased and the viewing efficiency is increased. Through obtaining the image information from the cache, the rate for obtaining the image information is increased. The images are displayed in form of thumbnails, which saves display spaces. The thumbnails are stored in the thumbnail database. Thus, it is not required to decode the images each time the user views the images, which reduces overload of a processor and saves network resources. Through obtaining the thumbnails from the cache, the rate for obtaining the thumbnails is increased and the network resources are saved.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A method for processing images, comprising:
   determining a target folder selected by a user;
   searching for image information of the target folder, searching for information of all subfolders of the target folder, traversing all subfolders corresponding to the information of all subfolders and obtaining image information of all subfolders; and
   obtaining images according to the image information of the target folder and the image information of all subfolders, processing the obtained images and displaying the processed images in a flat-folder-view manner;
   before determining the target folder selected by the user, the method further comprises:
   establishing a database, and storing the information of the target folder, the information of all subfolders, the image information, relationship information between the target folder and the subfolders, and association information between folders and images which are obtained through scanning in the database; wherein the database is searched for the information of all subfolders of the target folder, the image information of the target folder and/or the image information of all subfolders;
   wherein the information obtained through scanning comprises information obtained through scanning a Master File Table (MFT), wherein the scanning the MFT comprises:
   locating an MFT data area, traversing the MFT data area, obtaining directory information of the target folder and a root index corresponding to the directory information from the MFT data area, re-creating a folder path according to the directory information and the corresponding root index, and obtaining the information of the target folder;
   after searching for the information of all subfolders of the target folder, the method further comprises:
   creating a task list according to the information of all subfolders, wherein the task list is in an inverted tree structure, the subfolders corresponding to the information of the subfolders are task nodes of the task list; the task nodes in the task list are added into a folder task queue; a finish attribute identifier is configured for each task node;
   the traversing all subfolders corresponding to the information of all subfolders and obtaining the image information of all subfolders comprises: traversing the task nodes in the folder task queue, finding the image information of the subfolders corresponding to the task nodes;
   wherein the traversing the task nodes in the folder task queue comprises: transferring a task of obtaining image information from a finished task node to an unfinished task node pointed to by the finished task node;
   wherein the transferring the task of obtaining image information from the finished task node to the unfinished task node pointed to by the finished task node comprises:
   obtaining a first task node and a second task node pointed to by the first task node, wherein the first task node is the finished task node and the second task node is the unfinished task node;
   calculating a first tree height and a second tree height, wherein the first tree height is a tree height of a set where the second task node is located if the first task node directly points to the second task node, the second tree height is a tree height of a set where the first task node is located after the first task node swaps contents with the second task node; and
   determining whether the first tree height is smaller than the second tree height; if the first tree height is smaller than the second tree height, directly pointing the next task of the first task node to the second task node; otherwise, swapping contents of the first task node with the second task node and pointing the next task of the new first task node to the new second task node.

2. The method of claim 1, wherein the obtaining of the second task node comprises:
   querying a task node pointed to by the first task node and checking a finish attribute identifier of the task node; if the finish attribute identifier indicates an unfinished status, taking the task node as the second task node pointed to by the first task node; if the finish attribute identifier indicates a finished status, traversing another task node pointed to by the first task node.

3. The method of claim 1, further comprising:
   obtaining a view-locating operation of the user;
   obtaining location parameters according to the view-locating operation; wherein the location parameters comprises start folder location information, end folder location information, start image location information and end image location information; and
   determining a location area according to the location parameters, searching for images within the location area and displaying the images found out in the flat-folder-view manner.

4. The method of claim 3, wherein the determining the location area according to the location parameters, searching for images within the location area and displaying the images found out in the flat-folder-view manner comprises: determining whether there is the image information within the location area in a cache, if there is, obtaining the image information from the cache, finding images according to the obtained image information, processing the images found out to generate thumbnails and displaying the thumbnails; if there is not, finding the corresponding image information from a database according to the location information, finding images according to the image information, processing the images to generate thumbnails, displaying the thumbnails and storing the image information in the cache.

5. The method of claim 4, wherein
the cache used for storing the image information is an image information cache which comprises a background thread cache unit and a foreground thread cache unit, the background thread cache unit caches newest image information to be displayed, the foreground thread cache unit caches image information being displayed, after the background thread cache unit updates its image information to the foreground thread cache unit, the background thread cache unit is cleared.

6. The method of claim 1, wherein the obtaining images according to the image information of the target folder and the image information of the subfolders, processing the obtained images and displaying the processed images in the flat-folder-view manner comprises:
searching a cache for corresponding thumbnails according to the image information, if the thumbnails are found, retrieving the thumbnails from the cache and displaying the thumbnails; otherwise, searching a database for the corresponding images according to the image information, processing the images to generate corresponding thumbnails and displaying the thumbnails, and storing the thumbnails in the cache.

7. A system for processing images, comprising:
a processor;
a memory comprising instructions that when executed, cause the processor to perform the following:
obtain a target folder selected by the user, search for image information of the target folder and information of all subfolders of the target folder, obtain image information of all subfolders, and obtain images according to the image information of the target folder and the image information of all subfolders;
traverse all subfolders corresponding to the information of the subfolders;
process the images in the target folder selected by the user and the images in the subfolders; and
display the processed images in the target folder and the processed images in the subfolders in a flat-folder-view manner;
create a database, and store the information of the folder, the information of all subfolders, the image information, and association information between folders and images which are obtained by scanning in the database; and
search the database for the information of all subfolder of the target folder, the image information of the target folder and/or the image information of all subfolders;
create a task list according to the information of all subfolders; the task list is in an inverted tree structure, subfolders corresponding to the information of all subfolders are task nodes of the task list, the task nodes of the task list are added to a folder task queue;
configure a finish attribute identifier for each task node;
traverse the task nodes in the folder task queue; and
find the image information of the subfolders corresponding to the task nodes;
transfer an image information obtaining task from a finished task node to an unfinished task node pointed to by the finished task node;
obtain a first task node and a second task node pointed to by the first task node, wherein the first task node is a finished task node and the second task node is an unfinished task node;
calculate a first tree height and a second tree height, wherein the first tree height is a tree height of a set where the second task node is located when the first task node directly points to the second task node, the second tree height is a tree height of a set where the first task node is located after the first task node swaps contents with the second task node;
determine whether the first tree height is smaller than the second tree height; and
directly point a next task of the first task node to the second task node if the first tree height is smaller than the second tree height, and to swap contents of the first task node with the second task node and point the next task of the new first task node to the new second task node if the first tree height is not smaller than the second tree height.

8. The system of claim 7, wherein the processor further performs the following: query a task node pointed to by the first task node and check the finish attribute identifier of the task node, take the task node as the second task node pointed to by the first task node if the finish attribute identifier indicates an unfinished status, and traverse another task node pointed to by the first task node if the finish attribute identifier indicates a finished status.

9. The system of claim 7, further comprising instructions which cause the processor to perform the following:
obtain a view-locating operation of the user and obtain location parameters; the location parameters comprise start folder location information, end folder location information, start image location information and end image location information;
determine a location area according to the location parameters and search for images within the location area; and
display the images within the location area in the flat-folder-view manner.

10. The system of claim 9, further comprising: a cache adapted to cache the image information; and instructions which cause the processor to perform the following:
obtain the image information from the cache if the cache has the image information within the location area, search a database for the image information according to the location area if the cache does not have the image information within the location area, store the image information in the cache, and search for images according to the image information within the location area;
process the images to generate thumbnails; and
display the thumbnails.

11. The system of claim 7, further comprising: a cache adapted to store thumbnails; and instructions which cause the processor to perform the following:
retrieve corresponding thumbnails from the cache if the corresponding thumbnails are found in the cache according to the image information; display the thumbnails; search a database for corresponding images if the thumbnails are not found in the cache according to the image information, process the images to generate thumbnails and store the thumbnails in the cache.

* * * * *